May 14, 1935.   A. W. MOLINARE   2,001,393
ELECTRICAL CONTACT FOR ARTICULATED VEHICLES
Original Filed Oct. 28, 1931   2 Sheets-Sheet 1

Inventor
Anthony W. Molinare
by Burton and Burton
his Attorneys

May 14, 1935.  A. W. MOLINARE  2,001,393
ELECTRICAL CONTACT FOR ARTICULATED VEHICLES
Original Filed Oct. 28, 1931  2 Sheets-Sheet 2
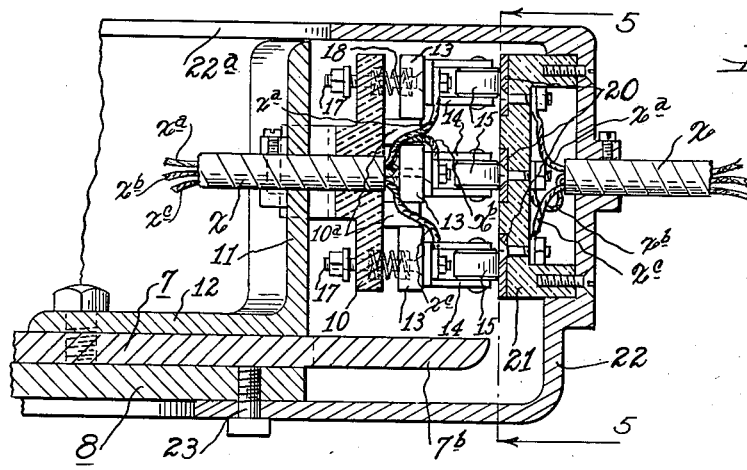
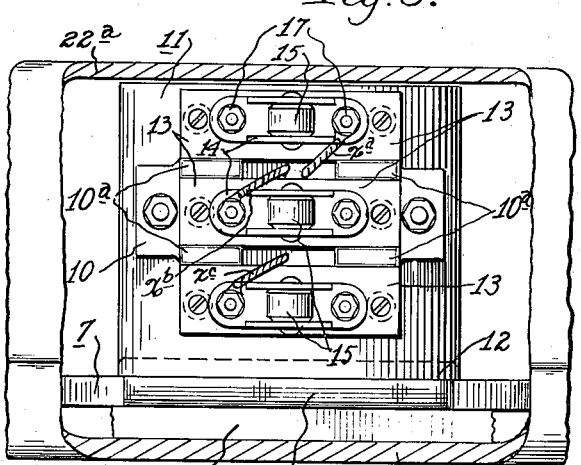
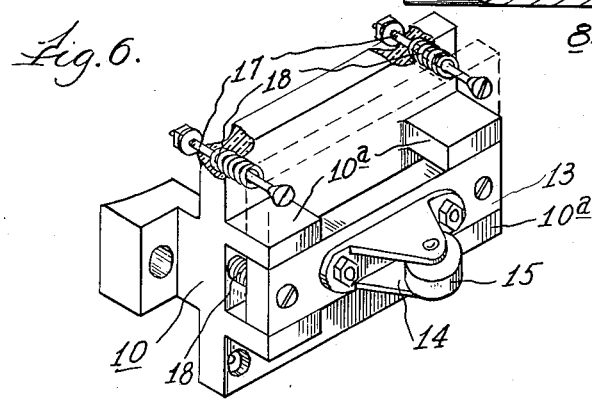
Witness
H. F. McKnight.
Inventor.
Anthony W. Molinare.
by Burton & Burton
his Attorneys.

Patented May 14, 1935

2,001,393

UNITED STATES PATENT OFFICE 2,001,393

ELECTRICAL CONTACT FOR ARTICULATED VEHICLES

Anthony W. Molinare, Forest Park, Ill., assignor to Highway Trailer Company, Edgerton, Wis., a corporation of Wisconsin Original application October 28, 1931, Serial No. 571,524. Divided and this application October 30, 1933, Serial No. 695,838

5 Claims. (Cl. 280—33.1)

This invention pertains to articulated vehicle units, such as a tractor and semi-trailer, adapted to be coupled together for joint operation. More particularly, this invention is concerned with the provision of electrical circuit connections associated with the coupling members of the vehicle units for supplying electrical current from one of said vehicle units to the other, such as from the tractor to the trailer. Electrical circuit connections of this character may be employed for operating various devices on the trailer, under remote control from the tractor, such as electrical brakes, temporary supports, tail-lights, signal lights, or any other electrically operated mechanism located on the trailer.

The main object of my invention is to provide improved and simplified electrical circuit connections between the articulated vehicle units for coupling one or more electrical circuits, with the connections so arranged as to maintain electrical contact throughout the normal range of angular adjustment of the vehicle units.

Another object is to provide electrical circuit connections with cooperating parts on the coupling members carried by the respective vehicle units, adapted to be automatically engaged or disengaged in response to the relative movement of the tractor and trailer into and out of coupling relation.

A further object of this invention resides in the novel construction and arrangement of the cooperating parts of the electrical circuit connections which are disposed remote from the axis of articulation and laterally beyond the entire area of bearing contact of the coupling members.

The invention consists in certain features and elements of construction, and novel arrangement thereof, as herein shown and described, and as indicated by the claims.

In the drawings:

Figure 4 is a vertical section through the electrical circuit connections, taken substantially at line 4—4 on Figure 3.

Figure 5 is a face view of the electric circuit connections carried on the upper fifth wheel member of the trailer, and taken as indicated at the line 5—5 on Figure 4.

Figure 6 is a fragmentary perspective view of the electrical contact carrier block mounted on the front end of the upper fifth wheel member on the trailer.

Figure 1:
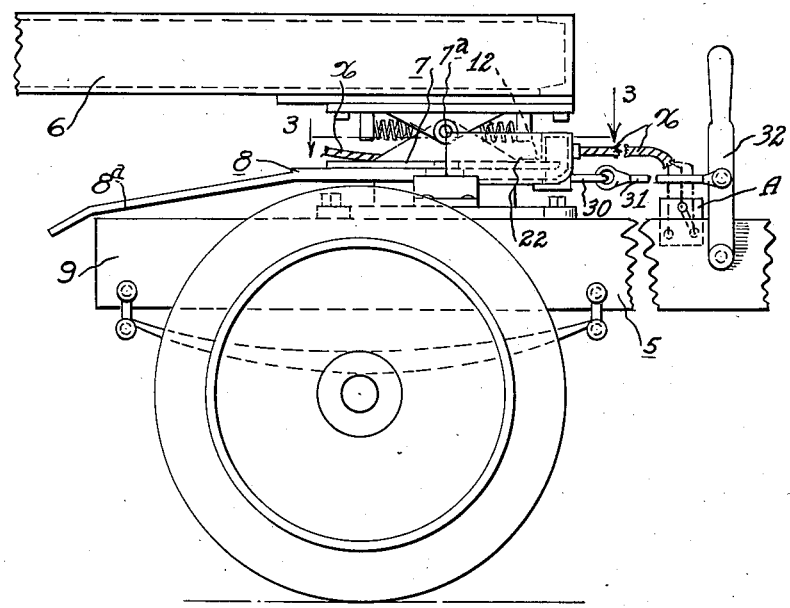
Figure 1 is a fragmentary view in side elevation of the forward end of a semi-trailer and the rearward end of the tractor, provided with coupling members having electrical circuit connections embodying the present invention.

The present application is a division of my co-pending application Serial No. 571,524, filed October 28, 1931.

The present invention eliminates certain disadvantages inherent in electrical circuit connections now generally employed for tractor and trailer use. Such connections usually include flexible cables on the respective vehicle units, and the ends of these cables are provided with co-operating detachable plug members which must be manually connected and disconnected. Tractor and trailer units, when in use, necessarily move relatively to each other through substantial angles, and frequently the plug members become separated due to snagging of the cables on parts of the tractor or trailer units. Also if the operator inadvertently fails to disconnect the plug members when uncoupling the tractor from the trailer, the plug members are apt to be injured and the cables are frequently damaged, and sometimes severed.

Referring now in detail to the drawings: The fragmentary portion of the tractor, indicated at 5, is shown in coupled and supporting relation to the forward end of a semi-trailer whose main frame is indicated at 6. The tractor and trailer are swivelly connected together by coupling means, including an upper fifth wheel member, 7, carried on the trailer frame, and a lower fifth wheel member, 8, fixedly mounted on the tractor frame, 9. The upper fifth wheel member, 7, is mounted for rocking fore-and-aft about a horizontal transverse axis indicated at 7ª, and it may be understood that this upper fifth wheel member is so designed that it normally tends to tilt upwardly at the forward end in a direction so as to facilitate skidding up the inclined portion, 8ª, of the fixed lower fifth wheel member on the tractor when the latter is backed underneath the trailer preparatory to coupling of the vehicle units. It may be understood that these fifth wheel members are of conventional design, and if desired the fifth wheel members may be of reverse relation,—that is, the upper fifth wheel member may be fixed on the trailer frame, and the lower fifth wheel member rockably mounted on the tractor, as long as the construction is such as to permit the vehicles to accommodate themselves to road-bed irregularities, while providing articulation between the vehicles.

The upper and lower fifth wheel members on the respective vehicle units are constructed in the usual manner with means for automatically locking them together in coupled relation when the tractor is backed beneath the trailer, as will be hereinafter described. The fifth wheel members are provided with means which include co-operating features on the respective fifth wheel members which are brought into engagement for automatically completing one or more electrical circuits between the tractor and trailer units, when the fifth wheel members are brought into coupled relation. The electrical circuits are likewise broken when the fifth wheel members are moved relatively to each other in the act of uncoupling the tractor and trailer. The electrical connections, as may be seen in the drawings, are, for practical purposes and ease in operation, located remote from the axis of articulation of the fifth wheel members, and include a supporting block, 10, of insulating material rigidly mounted on an upstanding flange, 11, of a bracket member, 12, secured to the forward end of the upper fifth wheel member, 7, as seen in Figure 4 of the drawings. The outer face of the insulating block, 10, is formed with two sets of vertically spaced transversely extending lugs or shelves, 10a, providing guideways in which are slidably mounted contact blocks, 13. Rigidly secured to each block is a bracket, 14, carrying a contact roller, 15, and said blocks and rollers are arranged in spaced-apart vertical alignment, as seen in the drawings. Each of the blocks, 13, is connected to the supporting block, 10, by a pair of transversely spaced bolts, 17, and coil springs, 18, encompass said bolts and are seated in recesses formed in opposing surfaces of the blocks, 10 and 13, for yieldingly urging the blocks, 13, with their contact rollers, 15, away from the supporting block, 10. By this arrangement the bolts serve to limit the amount of movement of said blocks, 10 and 13.

The electrical conductor wires on the trailer which extend from the device which is operated preferably by remote control from the tractor, are enclosed in a flexible sheath indicated at x, the forward end of which extends above the upper fifth wheel member, and is rigidly anchored in the upstanding leg, 11, of the bracket, 12, on said upper fifth wheel member, as seen in Figure 4 of the drawings. These conductors, which are indicated at $x^a$, $x^b$ and $x^c$, extend beyond the point of anchoring of the flexible sheath, through the insulating block, 10, where they are connected to the respective contact rollers, 15.

Mounted on the lower fifth wheel member, 8, on the tractor, for cooperative engagement with the contact rollers, 15, are three vertically spaced arcuate metallic conductor strips, 20, rigidly secured to an insulating block, 21, which, preferably, is also of arcuate formation. Said mounting block, 20, is rigidly secured in an arcuately formed auxiliary bracket, 22, which preferably is a cast member, and which encompasses the periphery of the forward portion of the lower fifth wheel member, 8, to which it is fastened by machine screws, 23, as seen in Figure 4. Connected to the respective contact strips, 20, as seen in the drawings, are the corresponding portions of the conductor wires, $x^a$, $x^b$ and $x^c$, which complete the electrical circuit between the tractor and trailer, to a power supply source on the tractor or trailer. The current through said conductor wires may be controlled by a switch, indicated generally at A, located on the tractor. The conductor wires extending from the lower fifth wheel member on the tractor are also encased in a flexible sheath, $x$, the end of which is rigidly secured in a boss on the auxiliary bracket, 22, as seen in Figure 4. It may be understood that the arcuate contact strips, 20, and supports therefor extend approximately 90 degrees on each side of the longitudinal center, so as to ensure maintaining electrical contact between the vehicle units throughout the normal range of articulation of said units. It will now be seen that the springs, 18, which normally urge the blocks, 13 with their contact rollers, 15, outwardly with respect to the supporting block, 10, ensures maintaining said rollers in yielding engagement with the contact strips, 20, on the lower fifth wheel member, when the fifth wheel members are in coupled relation.

The upper edge of the supporting bracket, 22, on the lower fifth wheel member is formed with a horizontally extending arcuate flange, 22a, positioned to overlie the electrical contacts carried on the upper fifth wheel member, on the trailer, throughout the entire range of articulation of the vehicles, and thus serves to protect said contacts against the natural elements and also shield them from dust, dirt and foreign matter. To protect the contact elements on the upper fifth wheel member against possible injury incident to coupling or uncoupling movements of the fifth wheel members relatively to each other, the upper fifth wheel member is preferably formed with an extension or shoe indicated at 7b, disposed substantially in alignment with and below the contact rollers, 15, and their supporting structure. When coupling the vehicles, the shoe will come into contact with the surface of the lower fifth wheel member as said fifth wheel members are being moved relatively to each other into coupling position, and thus prevent any possible chance of damaging the contact rollers, 15. It will be manifest that the contact rollers, 15, and the strips, 20, on the lower fifth wheel member on the tractor will freely separate and cause breaking of the respective electric cricuits when the fifth wheel members are separated in the uncoupling of the vehicle units.

It will be apparent that the automatic circuit connections above described may be employed for controlling from one vehicle the operation of electrically actuated devices of various character located on the other vehicle. For example, the operation of the trailer brakes of the temporary supports, tail-lights, signal lights on the trailer, or any other mechanism which it is desired to locate on the trailer, may be controlled from the tractor cab.

Figure 2:
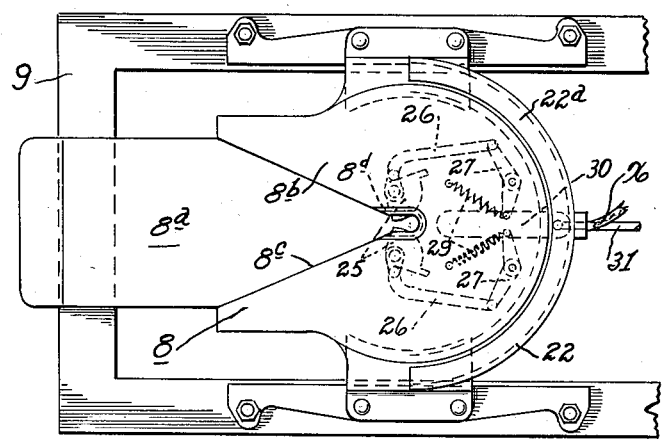
Figure 2 is a plan view of the lower fifth wheel member on the tractor.
Figure 3:
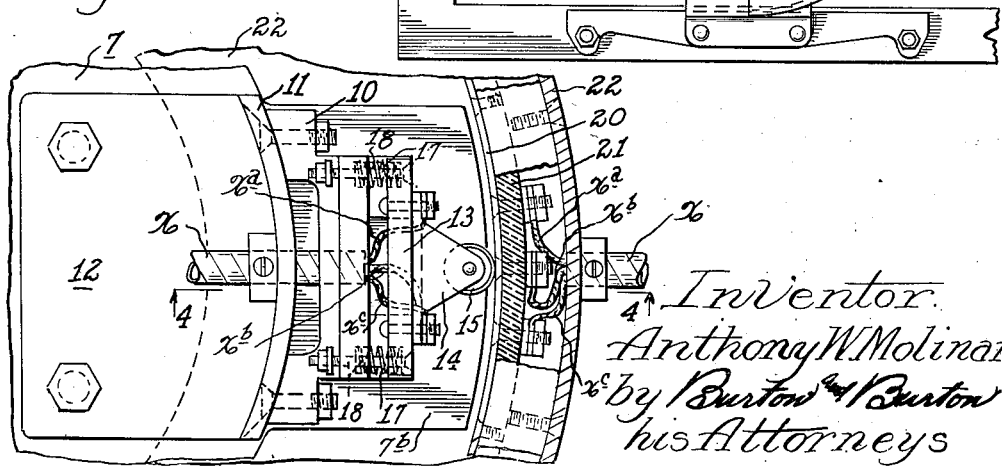
Figure 3 is a transverse horizontal section through the coupling members, taken at lines 3—3 on Figure 1, and showing the arrangement of the electrical circuit connections.

As shown in Figure 2 of the drawings, the lower fifth wheel member is of more or less conventional design. The main supporting surface, 8b, is formed with a rearwardly open V-shaped gap, 8c, the apex of which terminates to form a bearing for a headed king pin of conventional design (not shown), and which is carried on the upper fifth wheel member on the trailer. It will be understood that the bearing structure of the lower fifth wheel member is undercut, as indicated at 8d, in a usual manner to accommodate the head of the king pin, and thus prevent vertical separation of the fifth wheel members when they are coupled together.

Mounted on the under side of the lower fifth wheel member is a pair of pivoted jaws, 25, which are adapted to yield in one direction to permit entry of the king pin into the bearing portion of the lower fifth wheel member. The links, 26, and bell crank levers, 27, under the control the tension spring, 29, normally cause the jaws, 25, to snap back into locking position when released. The parts are so designed that when the king pin engages the jaws, contact therewith causes them to swing open for entering the bearing of the lower fifth wheel member and there be automatically locked in place by said jaws as the fifth wheel members are brought into coupled relation.

The free ends of the bell crank levers, 27, are connected to a control member, 30, to which is connected a member, 31, which extends into the cab of the tractor and is connected to an operating lever, 32, pivoted to the tractor frame, and this lever may be conveniently manipulated at will for releasing the jaws, 25, thereby freeing the king pin so as to permit separation of the fifth wheel members for uncoupling of the vehicle units.

By locating the electrical contact members laterally beyond the area of bearing contact of the fifth wheel members, safety of the contact elements is ensured against possible damage due to the coupling action of the vehicle units, and the contacts are prevented from being short-circuited by grease, grit, etc., which is normally present between the supporting areas of the fifth wheel members. By virtue of the arrangement herein shown and described, the contact members are never in contact with, or in close proximity to, the lubricated surface of the fifth wheel members. Furthermore, there is no possibility of the electrical contacts being short-circuited by moisture, such as results from rain or snow, as they are at all times enclosed; this also avoids possibility of injury to the unwary operator.

Although I have shown and described a preferred embodiment of the present invention, it is manifest that it is capable of modification and re-arrangement of parts without departing from the spirit and scope thereof. I do not, therefore, wish to be understood as limiting myself to the particular construction herein shown and described, except as indicated in the appended claims.

I claim:

1. In a tractor-trailer coupling comprising upper and lower fifth wheel parts adapted to be coupled and uncoupled by relative horizontal movement, electrical connector means comprising an arcuate contact member carried by one of said fifth wheel parts outside the area of their bearing contact and above the plane of such bearing contact, and a cooperating contact member carried by the other fifth wheel part, said contact members having substantially vertical surfaces which are brought into abutting engagement by movement of the fifth wheel parts into their coupled pivotal relation, the arcuate form of the one contact being concentric with the axis of said pivotal relation.

2. In the structure defined in claim 1, a horizontally extending hood disposed adjacent and above the arcuate contact member overhanging said member throughout its arcuate extent.

3. In the structure defined in claim 1, the lower fifth wheel part including an upstanding arcuate support outside the said area of bearing contact, the arcuate contact member being carried by said support and said support having a horizontally extending flange disposed adjacent and above said arcuate contact and serving as a hood therefor throughout the arcuate extent of the contact member.

4. In the structure defined in claim 1, the arcuate contact member being carried by the lower fifth wheel part and the cooperating contact projecting from the edge of the upper fifth wheel part, and a rigid guard shoe projecting from the edge of said upper fifth wheel directly below said cooperating contact, said shoe extending from said upper fifth wheel at least as far as said contact member.

5. In a tractor-trailer coupling comprising upper and lower fifth wheel parts adapted to be coupled and uncoupled by relative horizontal movement, electrical connector means comprising a plurality of arcuate contact strips carried by one of said fifth wheel parts outside the area of bearing contact of said parts upon each other, and a plurality of cooperating contact members carried by the other fifth wheel part, said arcuate strips being spaced apart vertically and all disposed above the plane of bearing contact of the fifth wheel parts, the cooperating contact members being similarly spaced apart vertically for registration with the arcuate strips respectively, the contact members of each group being insulated from each other and having vertically disposed contact surfaces which are brought into abutting engagement by movement of the fifth wheel parts into their coupled pivotal relation, and the arcuate form of said strips being concentric with the axis of pivotal relation of said fifth wheel parts.

ANTHONY W. MOLINARE.